(12) United States Patent
Gupta et al.

(10) Patent No.: US 7,793,061 B1
(45) Date of Patent: Sep. 7, 2010

(54) TECHNIQUES FOR USING FLASH-BASED MEMORY AS A WRITE CACHE AND A VAULT

(75) Inventors: Uday K. Gupta, Westford, MA (US); Charles H. Hopkins, Upton, MA (US); Michael B. Evans, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 568 days.

(21) Appl. No.: 11/824,577

(22) Filed: Jun. 29, 2007

(51) Int. Cl.
*G06F 12/16* (2006.01)

(52) U.S. Cl. .................. 711/162; 711/108; 711/119; 711/165

(58) Field of Classification Search .................. 711/118
See application file for complete search history.

(56) References Cited

U.S. PATENT DOCUMENTS 7,380,055 B2 * 5/2008 Ashmore .................... 711/112

2005/0117418 A1 * 6/2005 Jewell et al. .................. 365/202
2008/0114930 A1 * 5/2008 Sanvido et al. ............... 711/113

OTHER PUBLICATIONS

U.S. Appl. No. 11/729,705, French, et al.
U.S. Appl. No. 11/529,124, French, et al.
U.S. Appl. No. 11/478,029, Long.
U.S. Appl. No. 11/477,301, Long.
U.S. Appl. No. 11/378,722, Long.
U.S. Appl. No. 11/824,485, filed Jun. 29, 2007, Gupta, et al.

* cited by examiner

*Primary Examiner*—Jack A Lane
(74) *Attorney, Agent, or Firm*—Muirhead and Saturnelli, LLC

(57) ABSTRACT

Described are techniques for managing data in a data storage system. While the data storage system is operating in a first mode, portions of cached write data not yet destaged to a data storage device are copied from the volatile memory cache to a first area in a flash-based memory. In response to a vault operation event, the data storage system operates in a second mode in which all remaining portions of cached write data from the volatile memory cache not currently included in the first area are copied to a second area of the flash-based memory.

20 Claims, 15 Drawing Sheets

TECHNIQUES FOR USING FLASH-BASED MEMORY AS A WRITE CACHE AND A VAULT

BACKGROUND

1. Technical Field

This application generally relates to data storage, and more particularly to techniques used with caching and a flash-based memory vault.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with a write operation, the data storage system may utilize a variety of different techniques such as write-back caching. With write-back caching, the data storage system may temporarily cache data received from a host within its storage cache and destage the cached data at different times onto the physical disk drives. As known in the art, the cache used in the data storage system may be implemented using a fast, volatile memory, such as RAM (random access memory). The data storage system may utilize a backup or secondary power supply for use in connection with preventing loss of cached data in the event of a power failure. In the event of a power failure, the data storage system may utilize the backup power supply to provide power to the storage processor and physical data storage devices of the data storage system for a short period of time. During this period of time, the storage processor stores the data from its cache to a dedicated area on the storage devices that may be referred to as a "vault" so that the vault includes the cached data which has not yet been destaged onto the physical storage devices.

It should be noted that a data storage system may include multiple storage processors storing data to a same set of storage devices. Each of the storage processors may have its own cache so that cached data for the write operations, as well as possibly other cached data, may be mirrored in the caches of the storage processors. Multiple storage processors may be desirable for use in providing fault tolerance, higher throughput, and the like.

SUMMARY OF THE INVENTION

In accordance with one aspect of the invention is a data storage system comprising: a volatile memory cache including cached write data that has not yet been destaged to a data storage device; a flashed-based memory configured to include: a first area for storing at least a portion of cached write data from the volatile memory cache, and a second area for storing remaining portions of cached write data from the volatile memory cache not stored in the first area upon the occurrence of a vault operation event; and a controller coupled to the volatile memory cache and the flash-based memory, the controller being configured to: operate in a first mode in which cached write data is copied from the volatile memory cache to the first area, and, operate in a second mode in which remaining portions of cache write data from the volatile memory cache not currently included in the first area are copied to the second area upon the occurrence of a vault operation event; receive a signal indicating a vault operation event; and in response to receiving said signal, operate in said second mode. The data storage system may also include a secondary power source, and wherein, if the vault operation event is a power failure of a primary power source, the secondary power source may operate when in said second mode at least until the remaining portions are copied to said second area. One of said volatile memory or said flash-based memory may include information indicating what portions of the cached write data in the volatile memory are stored in the flash-based memory at a current point in time. When the controller is in the first mode, the controller may be further configured to: copy cached write data from the volatile memory cache to the first area; update the information indicating what portions of the cached write data have been moved to the flash-based memory in accordance with said copy; and indicate as available for reuse a portion of the volatile memory cache including said cached write data copied to the first area. The information may be stored in the volatile memory cache. The information may be stored in the flash-based memory. The second area may have a size larger than a size of said volatile memory cache. When the controller is in the first mode, the controller may perform processing to copy the cached write data from the volatile memory cache to the first area and to update the information indicating what portions of the cached write data are stored in the flash-based memory in accordance with said copy as a background process on a continuous basis. The data storage system may include multiple storage processors, each of said multiple storage processors including an instance of said volatile memory, said flash-based memory, and said controller local to said each storage processor. If cached write data from the volatile memory cache has been moved to a target location in the flash-based memory, the information may include an indicator indicating the target location as containing the cached write data to be destaged. An indicator may be maintained for each chunk of flash-based memory, said indicator being set when said each chunk includes cached write data moved from the volatile memory to be destaged, and is not set otherwise. When the controller is in the second mode, the controller may be further configured to: copy all remaining cached write data from the volatile memory cache not currently in the first area to the second area; store a version identifier identifying a version of the cached write data included in the flash-based memory; and update the information indicating what portions of the cached write data are stored in the flash-based memory in accordance with said copy.

In accordance with another aspect of the invention is a computer-implemented method for managing data in a data storage system, the method comprising: while the data storage system is operating in a first mode, copying portions of cached write data not yet destaged to a data storage device from the volatile memory cache to a first area in a flash-based memory; and in response to a vault operation event, operating in a second mode wherein all remaining portions of cached write data from the volatile memory cache not currently included in the first area are copied to a second area of the flash-based memory. The method may also include updating information indicating whether a portion of cached write data from the volatile memory cache is stored on the flash-based memory after the cached write data is copied to the flash-based memory. After a portion of the volatile memory cache is stored on the flash-based memory, the information may identify a source location in the volatile memory cache including said portion as being available, and the information may identify a target location on the flash-based memory at which the portion is stored as containing cached write data to be destaged. The information may be stored in the volatile memory. The information may be stored in the flash-based memory. When in the first mode, the method may also include: destaging cached write data from the flash-based memory to a data storage device; and accordingly updating the information to indicate that the cached write data is no longer in the flash-based memory. The vault operation event may be a primary power source failure, and a secondary power source may supply power for at least an amount of time required to copy remaining portions of cached write data from the volatile memory cache not currently included in the first area to the second area of the flash-based memory. The step of copying portions of cached write data not yet destaged to a data storage device from the volatile memory cache to a first area in a flash-based memory may be performed as a background processing operation. The background processing operation may also include: determining whether a threshold amount of storage is available on the flashed-based memory; and flushing a portion of cached write data on the flash-based memory to a data storage device if there is not a threshold amount available.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
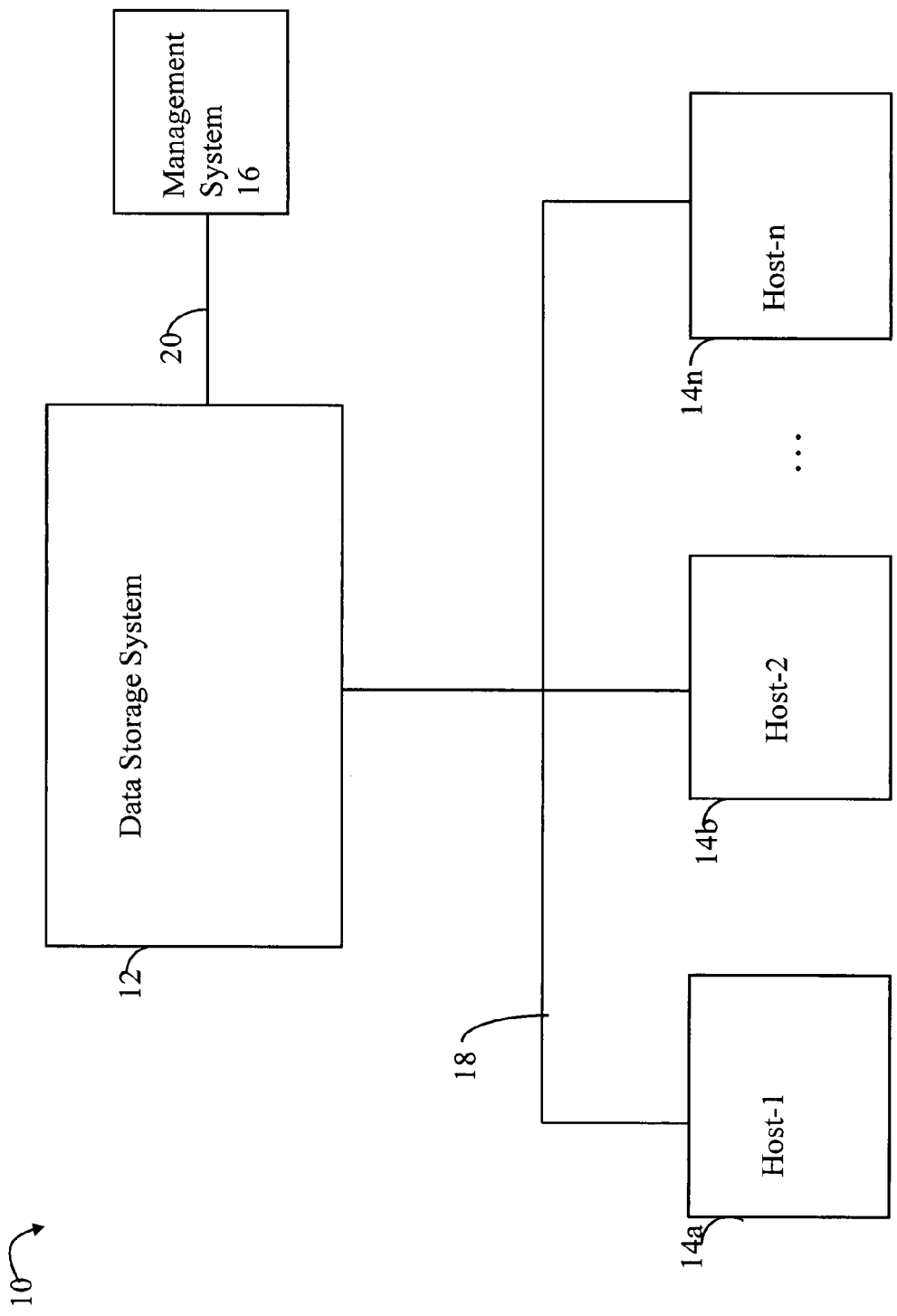
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

Figure 2:
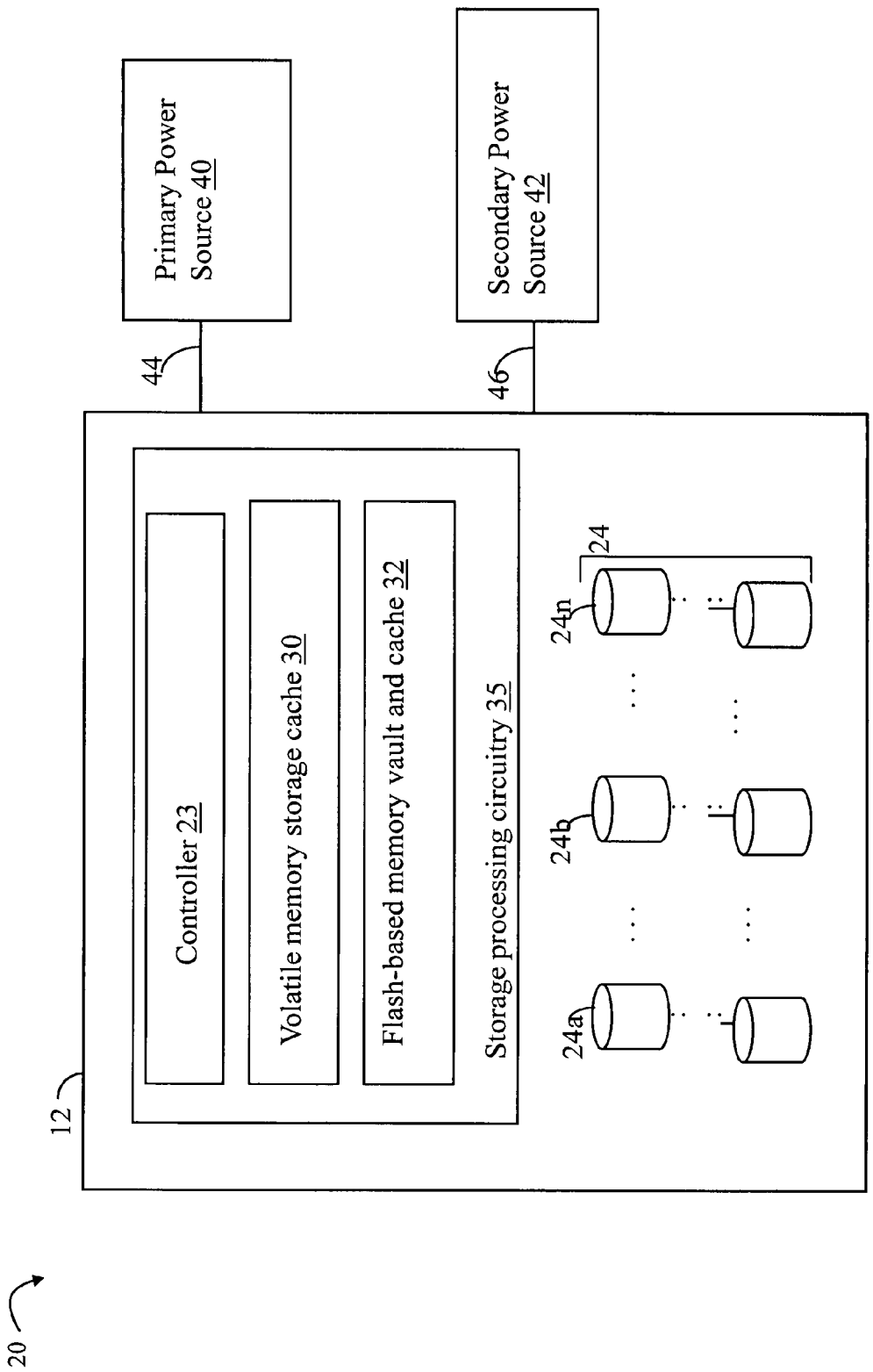
FIG. 2 is a diagram illustrating in more detail components that may be used in connection with techniques herein

Referring to FIG. 2, shown is a more detailed representation of components that may be included in an embodiment using the techniques herein. In the example 20, a data storage system 12 may include disks 24 accessed by logical volumes as described above. The data storage system 12 may also include controller a volatile memory cache and a flash-based memory vault and cache 32. The example 20 also includes a primary power source 40 and a secondary power source 42. The primary power source may be configured to provide power to the data storage system 12 under normal operating conditions. The primary power source may be an external power source. The secondary power source may be, for example, a set of batteries configured to provide backup power to the storage processing circuitry 35 in the event of a loss of primary power from source 40. Upon the event of a loss of primary power, a signal may be sent to the data storage system by either the source 40 or the source 42 to indicate that backup power is being utilized.

The data storage system 12 may also include a volatile memory (VM) storage cache 30 including any one or more different types of volatile memory, such as RAM. The flash-based memory vault and cache 32 is a flash-based memory or solid state drive (SSD) which is non-volatile to store data persistently. As will be described in more detail, the flash-based memory component 32 may be used as both a write cache and a vault area in accordance with techniques herein. The data storage system 12 may utilize a write-back caching technique in which data for a write request is first written to VM cache 30. The VM cache 30 is used to designate some portion of VM used as a write cache although there may be other VM included in the data storage system for other purposes. During normal operation, the techniques herein provide for continuously storing data from the VM cache 30 to a portion of the component The data is destaged at a later point from the component 32 to disk. Upon the occurrence of an event, such as a power failure of the primary power source 40, the data storage system may perform a vaulting operation to copy any remaining portions of the volatile memory storage cache 30 which are currently not stored in the component 32 to a vault area of the component 32. In this respect, a portion of the component 32 along with the VM cache 30 functions as the write cache for caching write data during normal operation. The component 32 is also utilized as a vault to which any remaining portions of the VM cache 30 are stored upon the occurrence of an event triggering the vaulting operation.

The controller 23 may be configured to perform data storage operations on behalf of the hosts of FIG. 1 during normal operation using the volatile memory storage cache 30, the flash-based memory vault and cache 30, and the disks 24. As described above during normal operation, when a host sends a request to write data to the data storage system, the controller 23 stores the data of the write request in the VM cache 30. Also, the controller may be configured to perform, for example, as a background process, to continuously copy data from the VM cache to a portion of the component 32. At some point later, the data is destaged or written out to the disks 24 from the component 32. The controller 23 may also be configured to perform the vaulting operation as described above copying any remaining portions of the volatile memory storage cache 30 which are currently not stored in the component 32 to a vault area of the component 32.

The controller may be configured to perform the vaulting operation in response to any one of a variety of different events. For purposes of illustration of the techniques herein, the loss of primary power causing the secondary power source to be utilized may be one type of event triggering the use of the techniques herein to perform a vaulting operation to copy remaining portions of the volatile memory storage cache 30 to the flash-based memory vault. However, it will be appreciated by those skilled in the art that different events may also trigger performance of the techniques herein for the vaulting operation. For example, loss of the backup or secondary power source while still having the primary power source available may also trigger performance of the techniques herein.

In the event of a power loss of the primary power source 40, the secondary power source 42 may be utilized. The power source 42 may be used temporarily to supply power to those components of the data storage system in connection with performing the vaulting operation. For example, the power source 42 may supply power to the circuitry 35 so that the controller 23 can remain operational and copy the remaining data from the VM cache 30 to the vault area of the component 32. Thus, the remaining data from the VM cache 30, which has not yet been destaged, is not lost. When the primary power source 40 is available again, the storage processing circuitry 35 may perform processing as described herein to flush or destage data from the component 32 so that a threshold amount of storage on the component 32 is available for use. This threshold amount may refer to an amount of contiguous storage. The threshold amount may be equal to the size of the VM cache 30 used as a write cache to ensure that, upon the occurrence of another vaulting operation trigger event, all the data from the VM cache 30 may be stored on the component 32. Once a threshold amount of storage on the component 32 is available indicating that at least the threshold amount of write data has been destaged from the component 32, the data storage system may resume processing data storage requests in a normal manner. The foregoing, and other variations, are described in more detail in following paragraphs.

As will be appreciated by those skilled in the art, the data storage 12 may also include other components than as described for purposes of illustrating the techniques herein.

Figure 3:
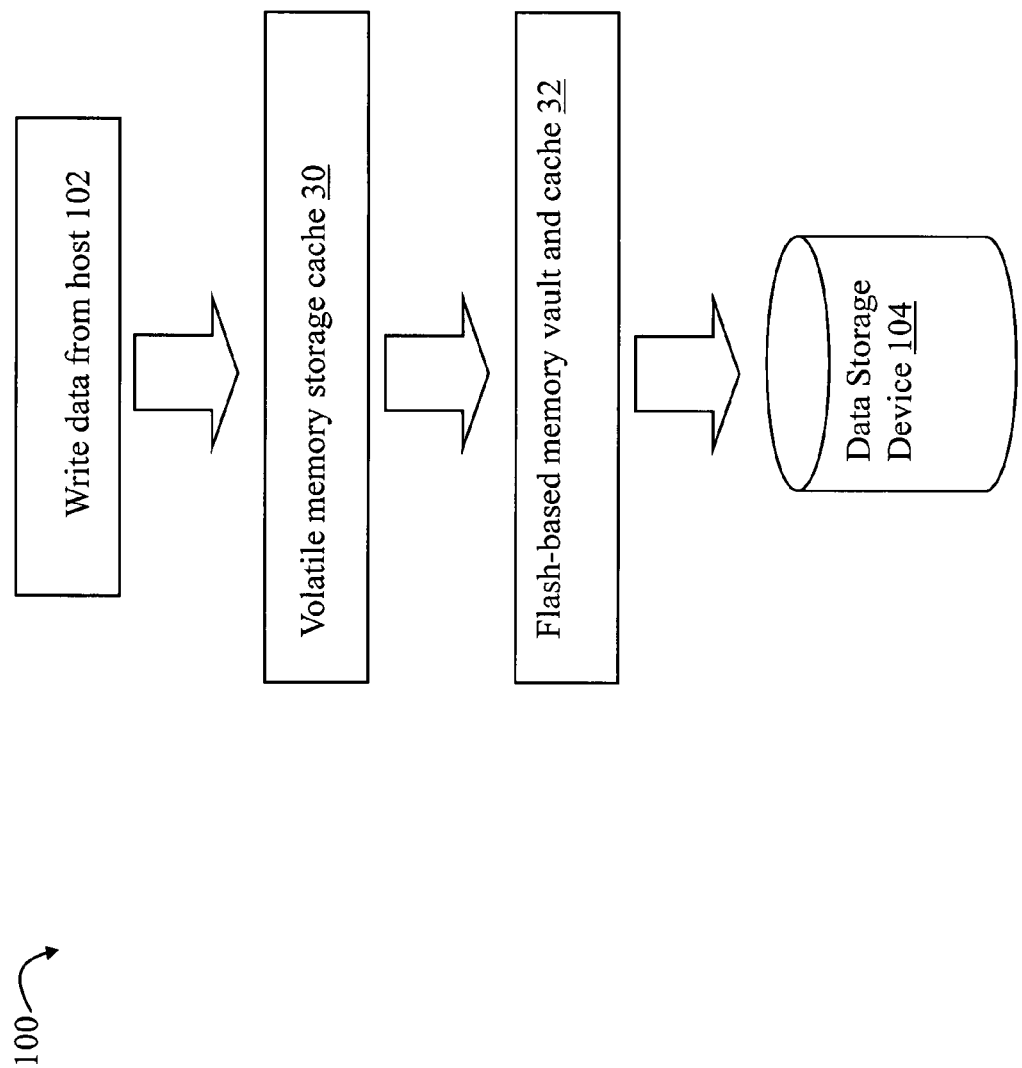
FIG. 3 is a diagram illustrating the flow of data in connection with processing a write request.

Referring to FIG. 3, shown is a flow diagram illustrating the flow of data in the data storage system. During normal processing as described herein, the write data received from the host 102 is cached in the VM cache 30. Data from the VM cache 30 is continuously copied from the component 30 to a portion of the flash-based memory vault and cache 32. Such copying of data from 30 to 32 during normal operation may be performed, for example, as a background copying operation. At some point later, the data is destaged from the component 32 to the data storage device 104, such as the disks 24 of FIG. 2. The foregoing describes processing during normal operation of the data storage system. Upon the occurrence of an event triggering the vault operation as described above, any remaining portions of the VM cache 30 which are not currently in the component 32 are copied to a vault area of the component 32. When the event causing the trigger event has been addressed, recovery processing may be performed in which the data storage system is able to resume normal processing of host requests when a threshold amount of storage on the component 32 is available. As described above, this may be accomplished by flushing at least the threshold amount of write data from the component 32 to the storage device 104 so that the system is able to perform processing upon the occurrence of another subsequent event triggering the vault operation as described herein. The foregoing is one of several different recovery processing techniques described in more detail herein that may be utilized in an embodiment.

Figure 4:
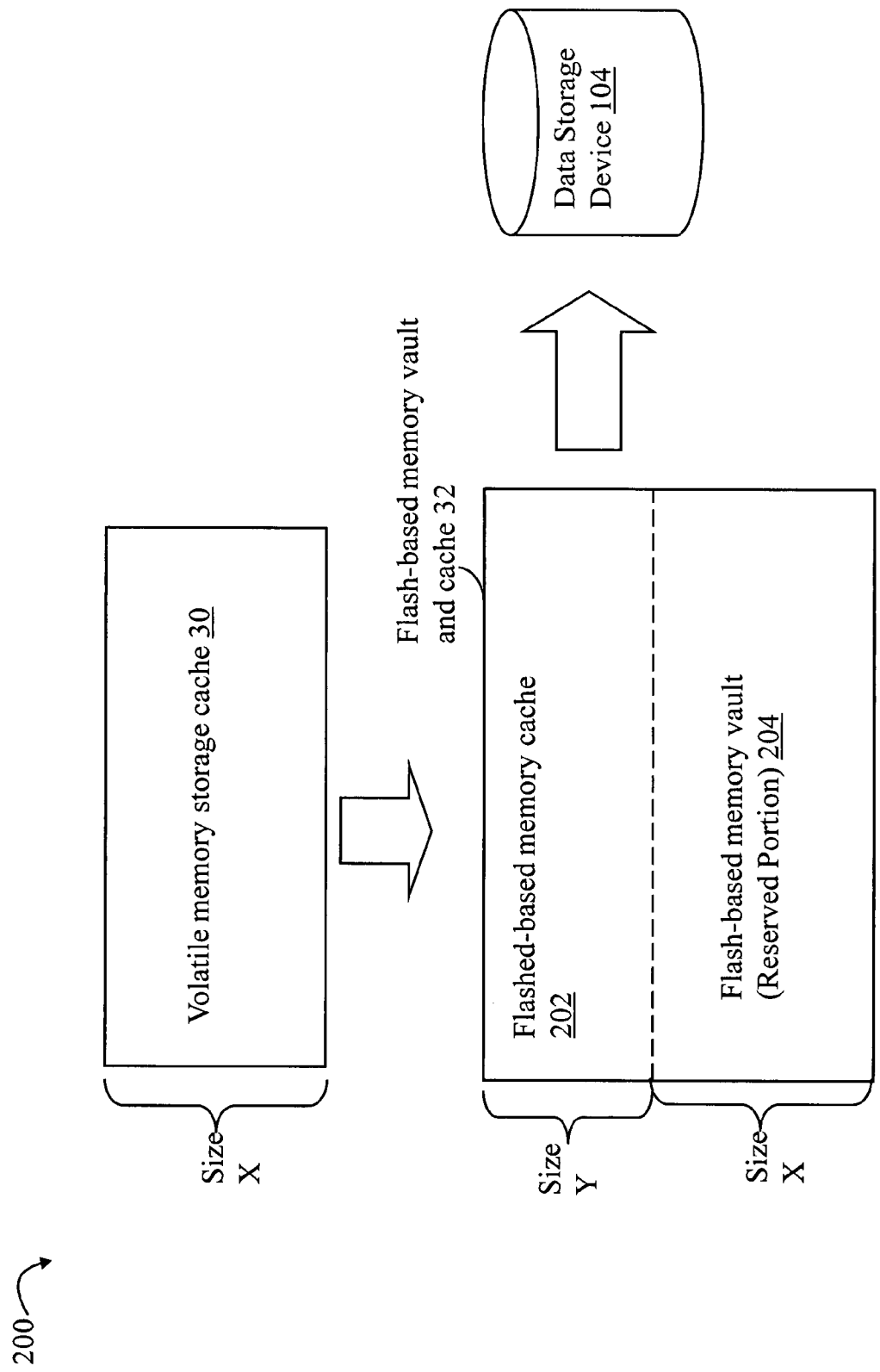
FIGS. 4-6 provide an example illustrating use of the techniques herein in connection with cached write data.

Referring to FIG. 4, shown is an example illustrating one configuration of the VM cache 30 and flash-based memory vault and cache 32 that may be used in an embodiment with the techniques herein. The VM cache 30 may be of a size X. As described above, the component 32 may have a size which is greater than X. In one embodiment, the component 32 may be partitioned into two portions 202 and 204. The portion 202 may be used as a flash-based memory cache and the portion 204 may be used as a flash-based memory vault. In one embodiment, the portion 204 may be a preallocated or reserved portion of the component 32. In other words, the portion 204 may have a fixed location within the component 32. In following paragraphs, reference is made to the configuration of FIG. 4 although it will be appreciated by those skilled in the art that variations are possible. For example, an embodiment may also use the techniques herein so that the portion 204 may be configurable to refer to any contiguous area of the component 32. Although FIG. 4 shows the portion 202 as a single contiguous area, portion 204 may have a location on the component 32 which causes the area 202 to be further partitioned. For example, the portion 204 may have a starting offset at a first location in the component 32 so that portion 202 is divided into two subsections, a first subsection located prior to 202 on the component 32 and a second subsection located after (e.g., having starting offset after) 202 on the component 32. An embodiment may also have each of areas 202 and 204 partitioned into multiple portions so that portions of area 202 are interspersed in between portions of area 204. In embodiments in which the areas 202 and 204 are not at a fixed location or may be interspersed in portions, the particular portions of the component 32 used for 202 and 204 may be indicated in a location variable, data structure, and the like, for use with the techniques herein.

With reference to the example 200, the component 32 may be partitioned into two areas 202 and 204 where the vault area 204 of the flash-based memory is not used during normal operation of the data storage system. During normal processing of data requests, write data is stored to the VM cache 30. At some point later, the data from VM cache 30 is copied to the flash-based memory cache 202. Once data from the VM cache 30 is copied to portion 202, the copy of the data in the VM cache 30 may be no longer retained within the component 30. The area of the VM cache 30 used to store the copy of the cached write data may be freed or made available for other uses once the cached write data has been copied from the VM cache 30 to portion 202. From portion 202, the write cache data is then destaged to the data storage device 104. During normal processing, the portion 204 is not utilized and the flow of data is from component 30, to portion 202 of component 32, to the data storage device 104. Upon the occurrence of an event triggering the vaulting operation, normal processing stops and remaining data from the VM cache 30 not already stored in 202 is then copied to portion 204. As an example of such an event, the primary power source may fail and the secondary power source may be utilized for the time period needed to complete the vaulting operation as described above.

An example further illustrating the data flow will now be described with reference to the configuration of FIG. 4.

Figure 5:
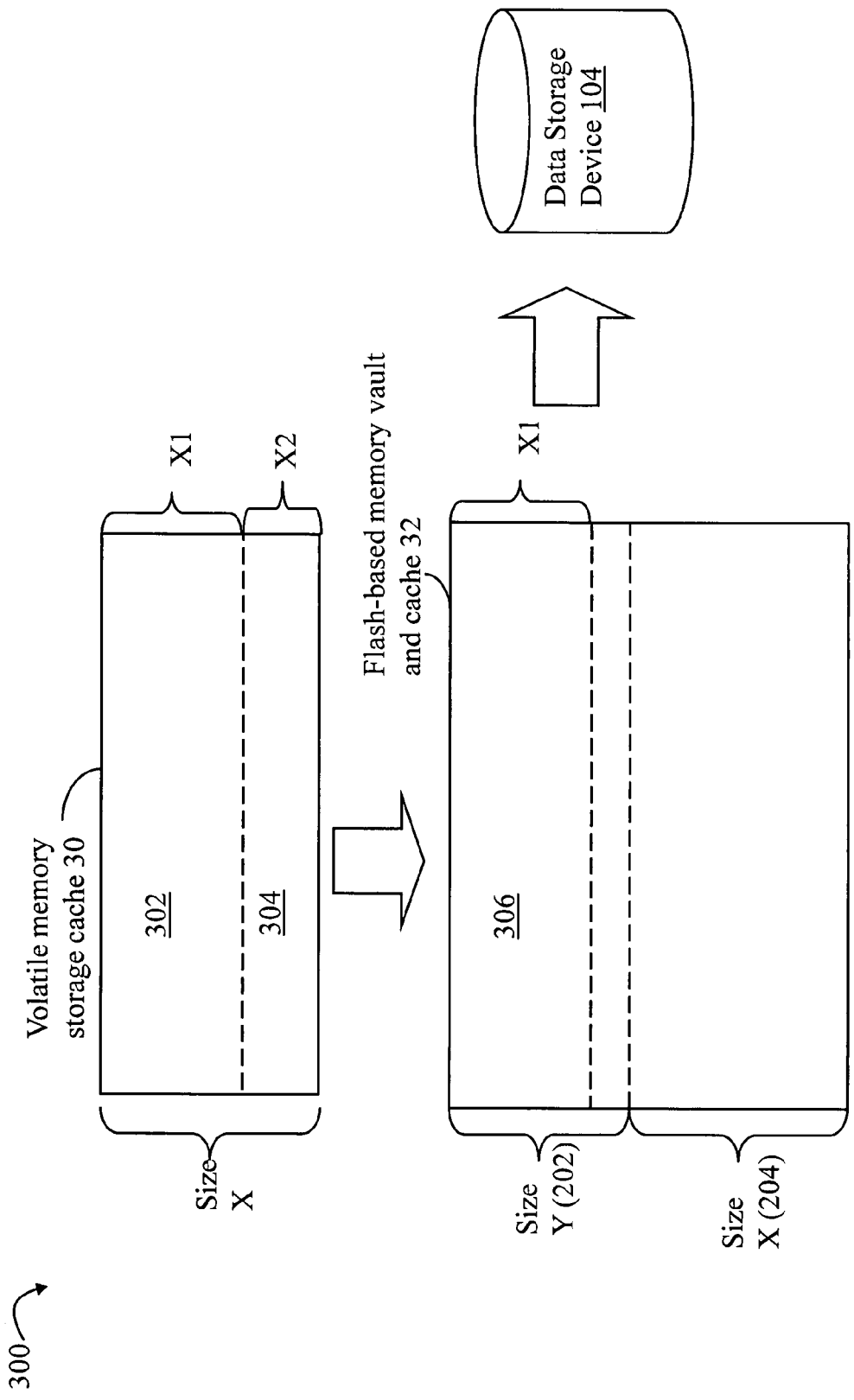

Referring to FIG. 5, shown is an example illustrating the state of the VM cache 30 and flash-based memory vault and cache 32 at a first point in time while performing normal processing of host data requests. The VM cache 30 may include write request data which has yet to be copied to the component 32 and which has yet to be destaged to the device 104. The portion 204 of the component 32 has not been utilized. The portion 202 has stored therein the data X1 from the write cache indicated by area 302. The data X1 is currently stored in the portion 202 as indicated by 306. The storage area 302 of the VM cache 30 is made available for other use and a copy of the data X1 may no longer be retained in the VM cache 30 once the cached write data from area 302 has been copied to area 306 of the component 32. At this point, an event occurs triggering the vaulting operation using the techniques herein.

Figure 6:
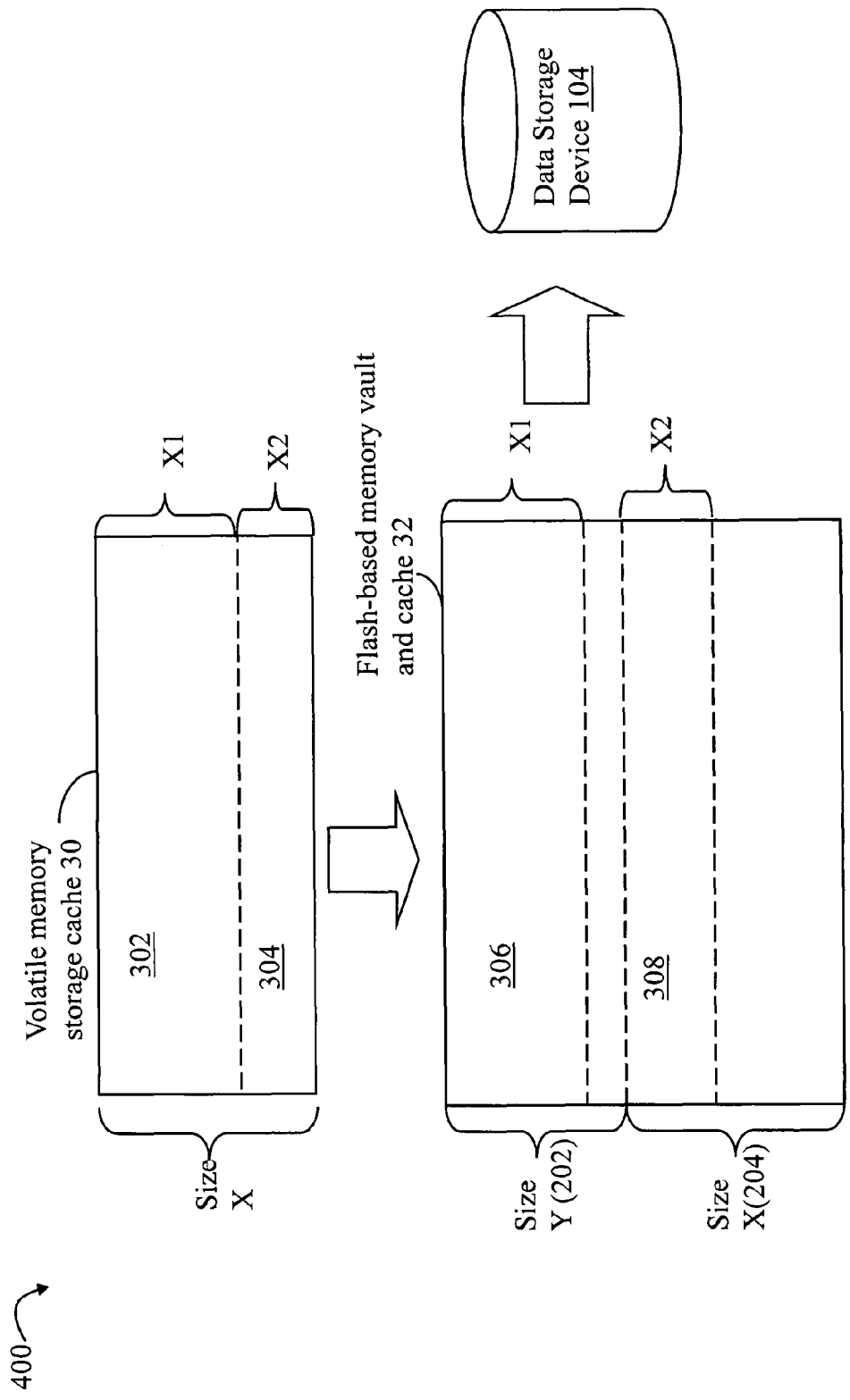

With reference to FIG. 6, it is determined that the data X2 as indicated by area 304 is not currently stored on the component 32. The controller commences processing so that the data X2 from 304 is copied to the portion 204 as indicated by 308. If the event triggering the vaulting operation a loss of primary power, the secondary power source may remain on at least temporarily long enough to complete the vaulting operation providing power to those components necessary to perform the vaulting operation. With reference to FIG. 2, this may include the components 30, 32, and 23 and possibly others. However, secondary power is not needed to be supplied to store data on the disks since the vault area is located on the flash-based memory 32. Furthermore, at most all the data from the VM cache 30 needs to be copied to the component 32. It may be that less than all the data from the VM cache 30 is copied depending on the size of the component 32 affecting the amount of flash-based memory used as a cache during normal processing operation.

With reference to FIG. 5, when operating in a first mode of normal processing of data requests, the portion 202 operates as a portion of the write cache storing cached write data waiting to be destaged, and the portion 204 operates as a vault area. With reference to FIG. 6, when operating in a second mode for the vault operation, the portions 202 and 204 are utilized as the vault area of the data storage system representing the write cache data that has not yet been destaged to the disk.

What will now be described is an example of how cached write data may be copied from the VM cache 30 to the portion 202 of the component 32 during normal operation and processing of data requests. Subsequently, a data structure used to track which portions of the VM cache have been moved to the portion 202 will also be described.

Figure 6A:
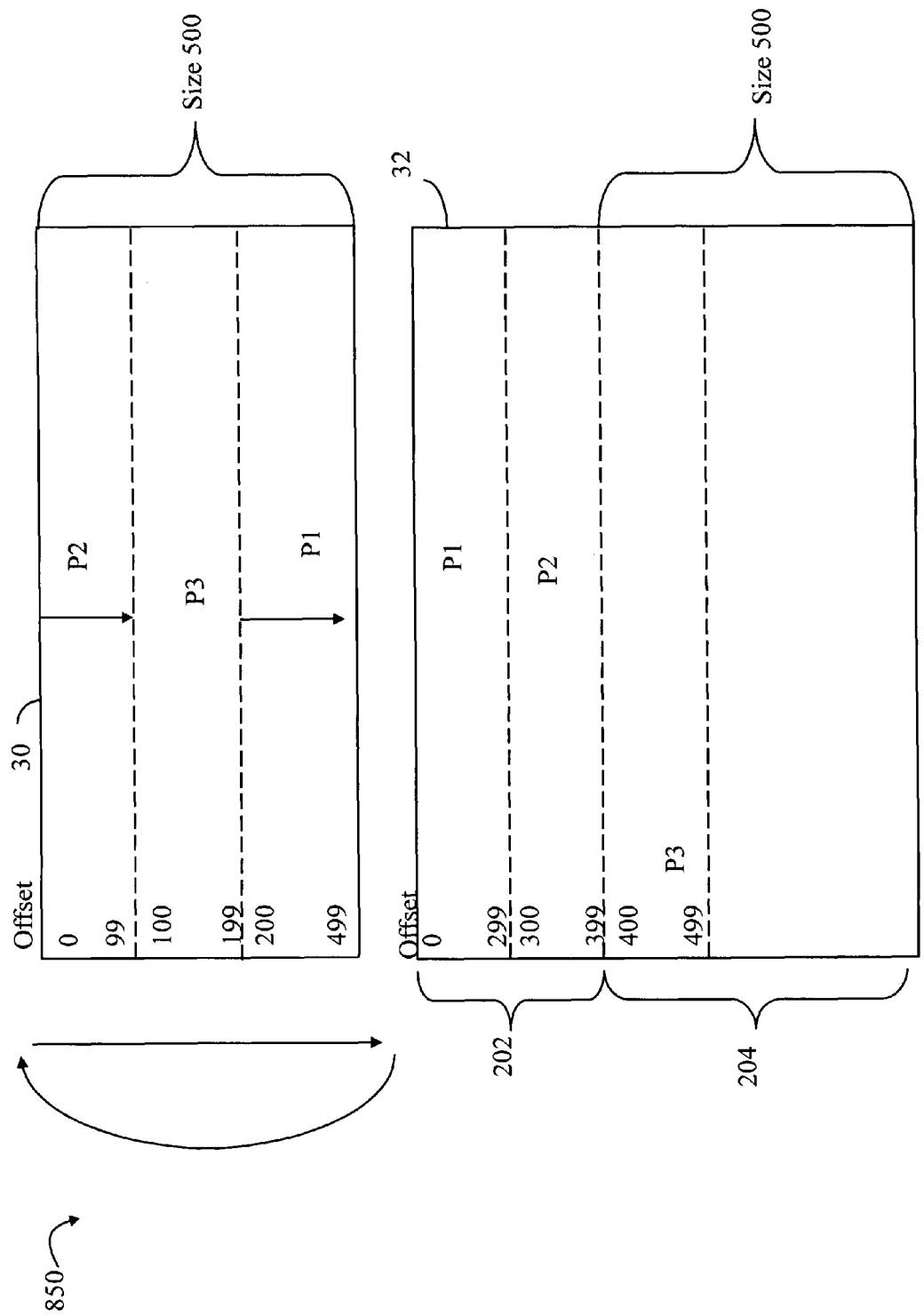
FIG. 6A is another example illustrating the techniques herein in connection with copying cached write data from the volatile memory cache to flash-based memory.

Referring to FIG. 6A, shown is an example illustrating a technique used for copying cached write data from VM cache 30 to the component 32. During normal operation, data may be copied in a top to bottom fashion from starting to ending location with respect to the component 30. The foregoing may be performed on a continuous basis by a background process. Once the background process reaches the ending location of the VM cache 30, the background process continues copying again from the first location of the VM cache 30 containing new write cache data. As described elsewhere herein, after the cached write data is copied from the VM cache 30 to the component 32, the portion of the VM cache 30 used to store the cached write data may be made available for other uses and the portion of the VM cache 30 may no longer retain a copy of the cached write data.

In the example 850, shown for purposes of illustration are sizes and starting offsets for different portions of write cache data P1, P2 and P3, components 30 and 32, and portions 202 and 204 of the component 32. Data is copied starting from offset 0 of the component 30 to the portion 202. As the cached write data is copied from the component 30 to 32, the area in 30 allocated for the cached write data is made available for other uses. As data is destaged from portion 202 to disk, areas of 202 are available for subsequent use in copying other data from the component 30. If there is no space available in portion 202, the background copying from component 30 to component 32 stops until data from portion 202 has been destaged thereby making space on 202 available for a next portion of write data from the component 30.

In this example, the background process has copied portions P1 and P2. Upon the occurrence of an event that triggers the vault operation, data from P3 of component 30 is copied to portion 204 as illustrated.

Figure 6B:
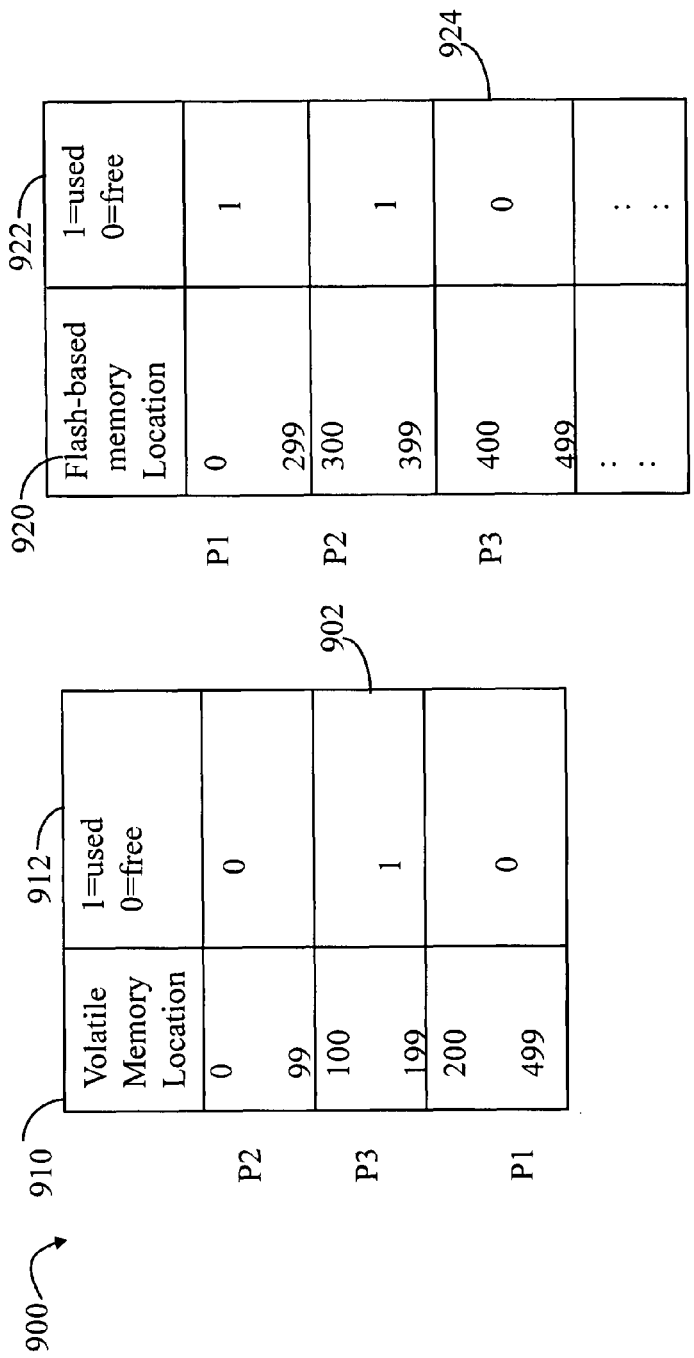
FIG. 6B is an example representation of information that may be stored indicating what portions of the volatile memory cache are stored on the flash-based memory for the illustration in FIG. 6A prior to performing vault operation processing.

Referring to FIG. 6B, shown is a representation of the information that may be maintained in an embodiment in connection with the techniques herein. The example 900 illustrates a first table 910 having entries indicating whether particular portions of the VM cache have been moved to the flash-based memory cache portion of the component 32. Data from the VM cache may be moved in chunks that may vary in size. The table 910 may include an entry for each chunk of VM cache with information as to whether it has been moved to the cache portion 202 of the component 32. If a portion of the VM cache has been moved to the component 32 in the cache portion 202, the table 910 stores a value of 1 for the corresponding entry in column 912. Otherwise, the entry has a value of 0 indicating that the corresponding VM cache location does not have data included therein to be moved. Each entry in the table 910 may be initially 0 indicating that the entry is free and available for use. Once data is stored in the VM cache location, the corresponding value in 912 is set to 1 so that, for example, the background copying process knows which VM cache locations should be moved to the cache portion 202 of flash-based memory. Once the cached write data has been moved from a source location of the VM cache to a target location in the flash-based memory, the entry of the table 910 corresponding to the source location has the value in column 912 for that entry set to 0 indicating that the VM cache source location can be reused.

Also included in the example 900 is a table 920 having entries indicating whether a portion of the flash-based memory is in use. In this example, the table 920 may include an entry for a chunk or portion of the flash-based memory of both the cache portion 202 and the vault portion 204. In normal operation, only the entries of 920 corresponding to the cache portion 202 are used. Initially, all entries in the table 920 may be set to 0. When the background copying process moves a portion of cached write data from a source location in the VM cache to a target location in the cache portion 202 of the flash-based memory, an entry in the table 920 for the target location has the value in column 922 for that entry set to 1 indicating that the target location in the flash-based memory contains cached write data to be destaged. Once the contents of a location in the cache portion 202 has been destaged, the entry of 920 for the location has the value in column 922 set to 0 indicating that the location in 202 is available for use. An embodiment may implement the tables 910 and 920 as bitmaps or bit vectors with entry "n" in each vector corresponding to a next chunk or portion. In other words, the locations indicated in the first columns of 910 and 920 may be implied and the bit vectors may represent the values in columns 912 and 922. Although the example 900 shows two tables, an embodiment may store all the information in a single table or bit vector.

The example 900 illustrates the state of the tables upon the occurrence of an event triggering the vault operation described herein. In the example 900, the table entry 902 indicates that cached write data portion P3 of FIG. 6A has not yet been copied to the flash-based memory. As such, processing for the vault operation makes such a determination, copies the data portion P3, and then updates the information in the table 910. In this example, the data from P3 may be copied to a portion of the flash-based vault area 204 such as at the location corresponding to entry 924 of table 920. After P3 has been copied from the VM cache to the vault area location, the information in tables of the example 900 may be accordingly updated.

As will be appreciated by those skilled in the art, the information in the tables 910 and 920 of FIG. 6B may be updated as data is moved from the VM cache 30 to the flash-based memory (e.g., portion 202) as part of normal processing operations. Once a source location of the write cache data from the VM cache 30 is moved to a target location of the flash-based memory (e.g., portion 202) as part of normal processing operations, the table 910 of FIG. 6B has an entry corresponding to the source location updated (e.g., =0) and the area of the VM cache 30 used to store the cached write data is thus indicated as free and available for other uses. Additionally, the entry in table 920 corresponding to the target location of the cache portion 202 has the entry's value updated (e.g., =1) to indicate that the target location has cached write data to be destaged. Once the write cache data from the flash-based memory has been destaged from a location in the cache portion 202, the entry in the table 920 corresponding to the location in portion 202 may also be accordingly updated (e.g., =0) to indicate that the write cache data is no longer in the flash-based memory thus indicating portions of the flash-based memory portion 202 which are available for storing subsequent data from the VM cache 30. As described herein, an embodiment may utilize a background process to copy data from the VM cache 30 to the portion 202 and the background process may update the tables of FIG. 6B as the data is copied. The background process may use the table 920 of FIG. 6B to determine which portions of the flash-based memory portion 202 are available for use at a point in time.

It should be noted that the tables of FIG. 6B may be stored in either the VM cache 30 of FIG. 2, or a portion of the flash-based memory of component 32 of FIG. 2. In normal operation the tables can be stored in either location although an embodiment may store the tables in the VM cache 30 providing faster access to the tables than if stored in the component 32. If the tables of FIG. 6B are stored in the VM cache 30, the tables are saved to the flash-based memory vault area 204 along with the remaining portions of the VM cache 30 upon the occurrence of a vaulting event.

It will be appreciated by those skilled in the art that the representation of the information in FIG. 6B may take any one of a variety of different forms and the example 900 is only one such representation.

Figure 6C:
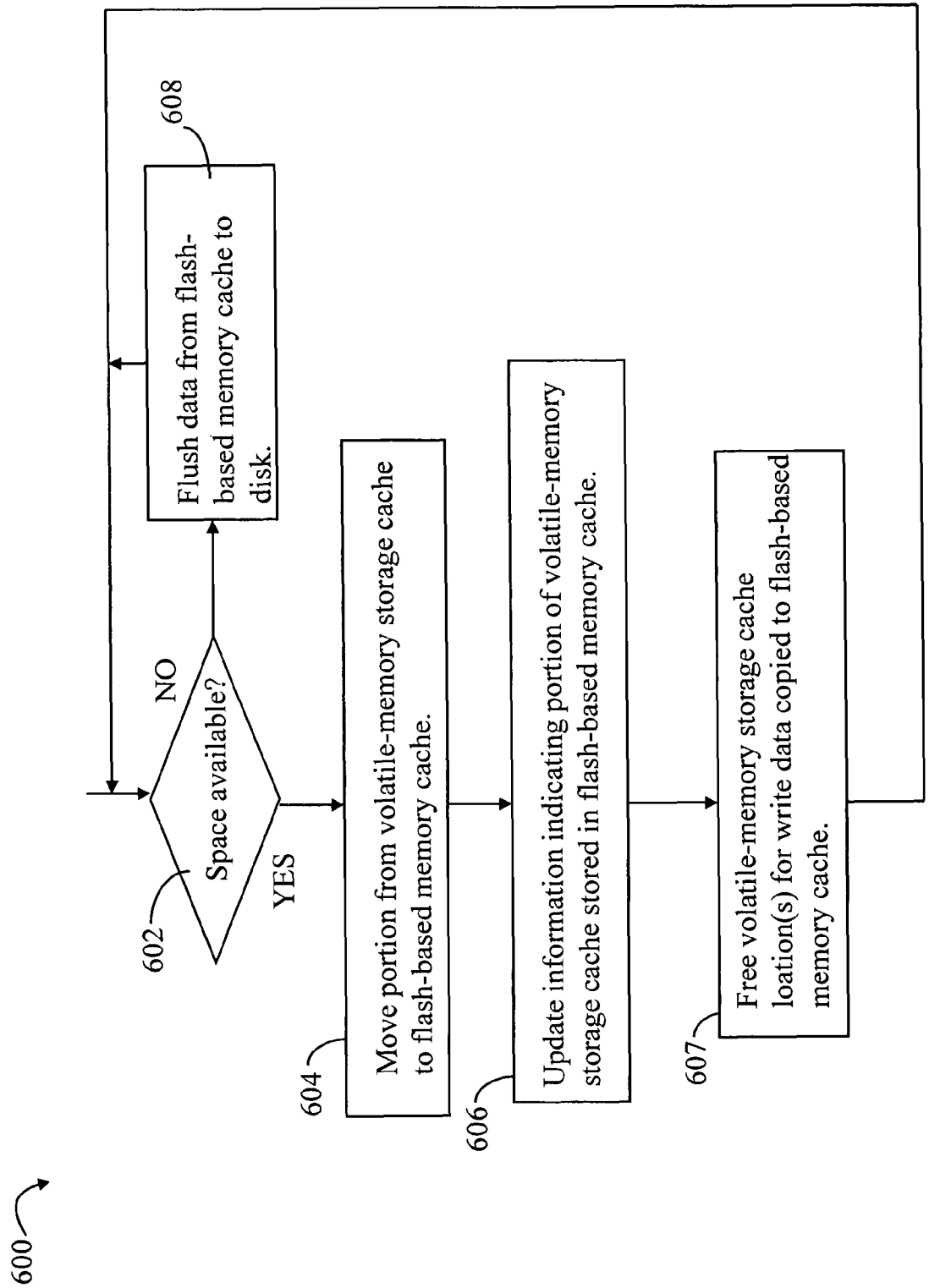
FIG. 6C is a flowchart of processing steps performed by a background process copying data from the volatile memory cache to the flash-based memory cache.

Referring to FIG. 6C, shown is a flowchart of processing steps that may be performed in an embodiment by the background process copying data from the VM cache to the cache portion of the flash-based memory. The flowchart 600 summarizes processing as described above and may be performed, for example, by the controller as part of normal processing and operation of data requests. At step 602, it is determined if there is space available in the cache portion of the flash-based memory for additional write cache data. This may be determined, for example, using table 920 of FIG. 6B. If not, control proceeds to step 608 where processing is performed to flush data from the cache portion of the flash-based memory and destage the write data to disk. Control proceeds back to step 602 until space is available in the cache portion for additional data. When step 602 evaluates to yes, control proceeds to step 604 where a next portion or chunk of write cache data is moved from the VM cache to the cache portion of the flash-based memory. At step 606, the information of the tables or other data structure used to maintain the information as represented in FIG. 6B is updated to reflect the location in the cache portion of the flash-based memory at which the chunk from the VM cache was stored in step 604. Step 606 may include, for example, setting the appropriate entry in the table 920 for the location of the cache portion of the flash-based memory utilized. At step 607, the volatile-memory storage cache location(s) used to store the portion of cached write data copied to the flash-based memory cache in step 604 is freed or made available for other uses. Step 607 may include, for example, clearing the appropriate entry in the table 910 of FIG. 6B for the volatile-memory cache location. Control then proceeds to step 602 for the next portion or chunk to be copied. Step 604 may select the next chunk of the VM cache to be copied as described herein or using other techniques known in the art.

In connection with the illustrations above, reference is made to data storage system including a single storage processor (SP) and components. The techniques herein may also be used in a data storage system having multiple SPs.

Figure 7:
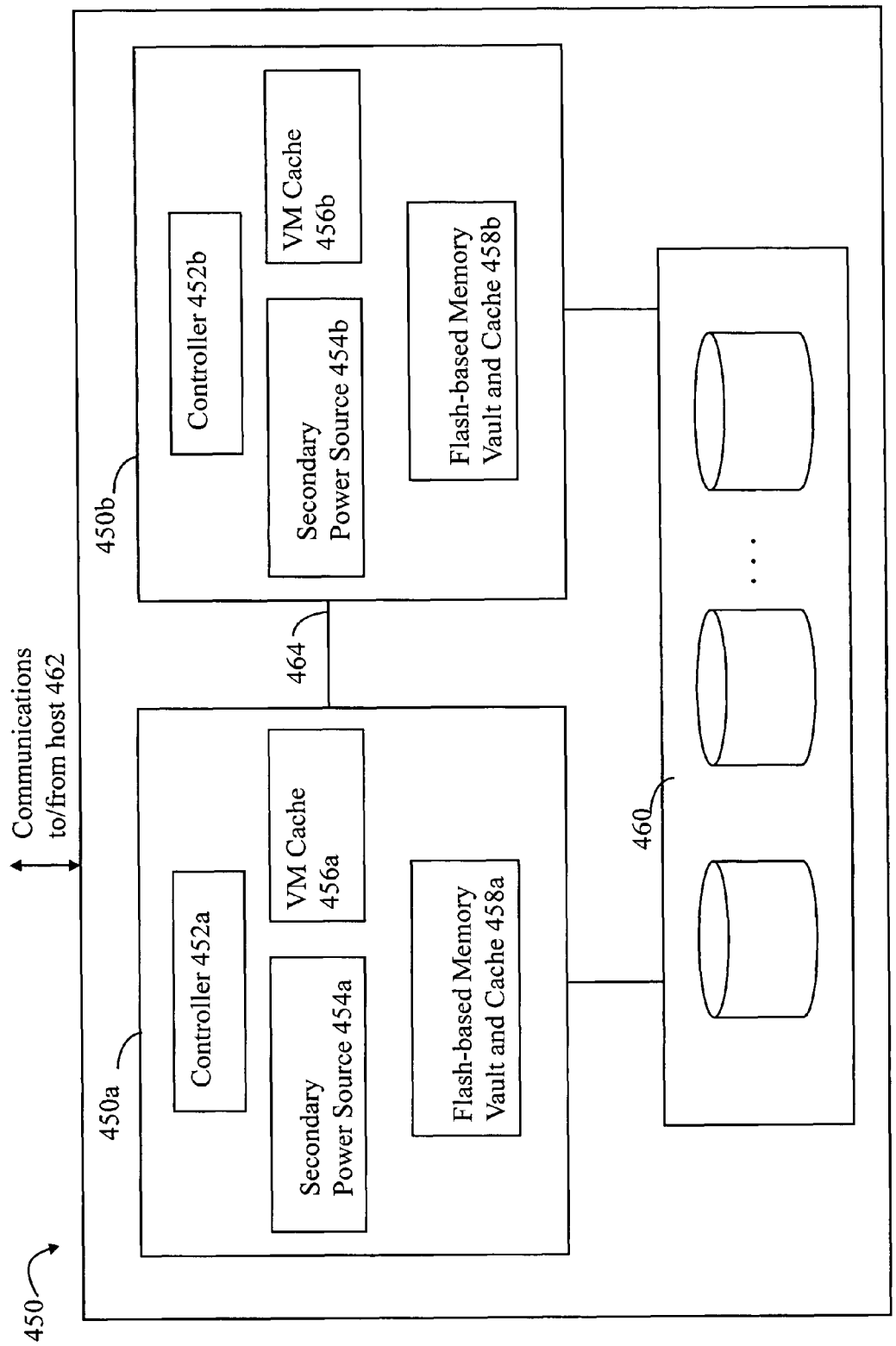
FIG. 7 is an example configuration of a dual storage processor configuration.

Referring to FIG. 7, shown is an example illustrating a dual SP configuration of a data storage system. In the example 450, two SPs 450a and 450b are shown. Both SPs utilize a same set of disks 460 and communicate with the hosts as illustrated by 462. The example 450 may represent, for example, one of the data storage systems of element 12 of FIG. 1. SP 450a may include a controller 452a, VM cache 456a, flash-based memory vault and cache 458a and secondary power source 454a. The secondary power source 454a may operate those components, such as 458a and 456a, of the SP 450a to perform the vault operation processing as described herein upon the loss of primary power. SP 450b includes components similar to those as just described for 450a. SPs 450a and 450b may communicate via a high-speed bus 464. Each SP is capable of communicating to its peer SP regarding its status (e.g., whether normal request processing is performed, whether vaulting operation processing is being performed, and the like). Additionally, the SPs 450a and 450b may exchange data so that the VM caches of each SP may mirror each other. The VM caches 456a and 456b in this example may be characterized as forming the VM cache of the data storage system used to cache write data. Similarly, the cache portions of 458a and 458b may also be characterized as portions of the write cache when in a first mode in which normal processing of data requests is performed. The cache portions of 458a and 458b of each SP may mirror each other. By having the VM caches 456a and 456b as well as the cache portions of 458a and 458b mirror each other, the cached write data in both SPs mirror each other. Also, when in normal processing mode, the vault portions (e.g., such as 204 of FIG. 4) of 458a and 458b may be characterized as the vault area. When in a second mode in which an event (e.g., a power failure) triggers the vault operation, the vault portions (e.g., such as 204 of FIG. 4) and the cache portions (e.g., such as 202 of FIG. 4) of 458a and 458b serve as the vault area for the data storage system. Thus, in accordance with the techniques herein, a first portion (e.g., 202 of FIG. 4) of the flash-based memory functions as both a write cache and as part of the vault area when SP is operating in the second mode. When operating in the second mode, the entire flash-based memory of the component 458a and 458b function as the vault area. When operating in the first mode, the first portions of the flash-based memory in both SPs are part of the write cache in combination with the VM caches 456a and 456b.

In the context of the dual storage processor configuration illustrated, each SP may operate so that the data included in the write caches of each SP mirror each other. That is, the cached write data of VM caches 456a and 456b mirror each other as well as the cache portions of 458a and 458b mirror each other. Furthermore, each SP may service a different set of logical devices of the data storage system so that although each SP may cache all write cache data that has not yet been destaged, each SP is responsible for destaging the write cache data destined for those logical devices associated with the SP.

Figure 8:
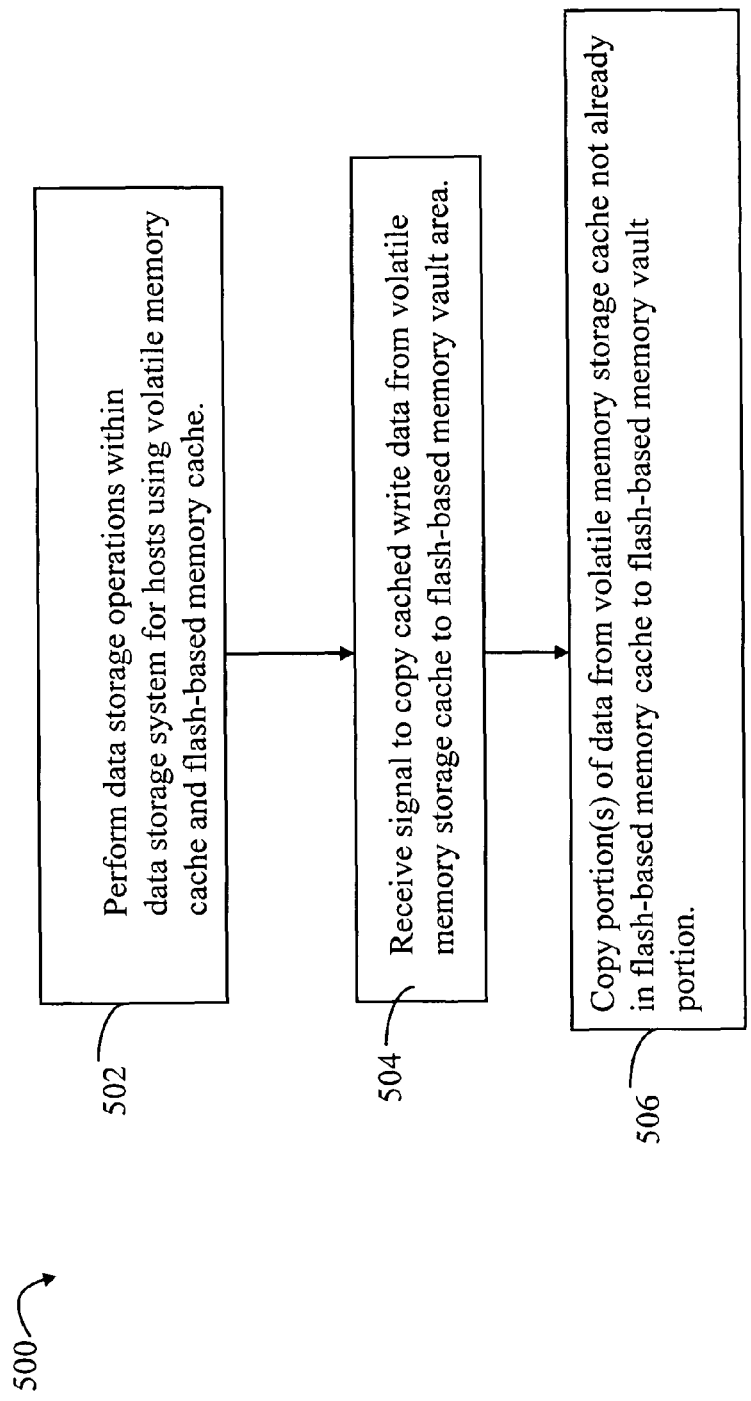
FIG. 8 is a flowchart of processing that may be performed in connection with the techniques herein.

Referring to FIG. 8, shown is a flowchart of processing steps performed in an embodiment in accordance with techniques herein. Flowchart 500 summarizes processing as described in connection with previous figures. At step 502, data storage operations are performed within the data storage system for hosts in accordance with normal processing mode using the VM cache and the flash-based memory cache for caching write data. At a point in time in step 504, the data storage system may receive a signal or other indicator placing the data storage system in a second processing mode of operation. In response to one or more defined events, the data storage system may enter the second mode in which the vault operation processing as described herein is performed. In step 506, portions of data from the VM cache which are not already in the flash-based memory are copied to the flash-based memory. In more detail, the portions of the VM cache which are not already included in the cache portion of the flash-based memory are now copied to another designated vault area. At this point in step 506, the entire flash-based memory, including the previously designated cache portion and the previously designated vault portion, functions as the vault comprising the write cache data that has not yet been destaged or flushed to disk. As described herein, the tables of FIG. 6B or other data structure may be accordingly updated as cached write data is copied from the VM cache to the flash-based memory and destaged as part of normal processing in connection with step 502 processing, and also as part of step 506 processing. Additionally, if the tables of FIG. 6B are stored in the VM cache, the tables are also copied to the flash-based memory vault area.

As described in more detail elsewhere herein when performing processing upon the occurrence of a vault operation event, an embodiment may store an identifier, such as a time stamp, generation counter, or other value, indicating a version of the data stored on the flash-based memory by the vault operation performed such in step 506 processing.

What will now be described are various techniques that may be used in connection with recovery processing in an embodiment subsequent to the occurrence of an event causing the vault operation processing as described herein to be performed.

Figure 9:
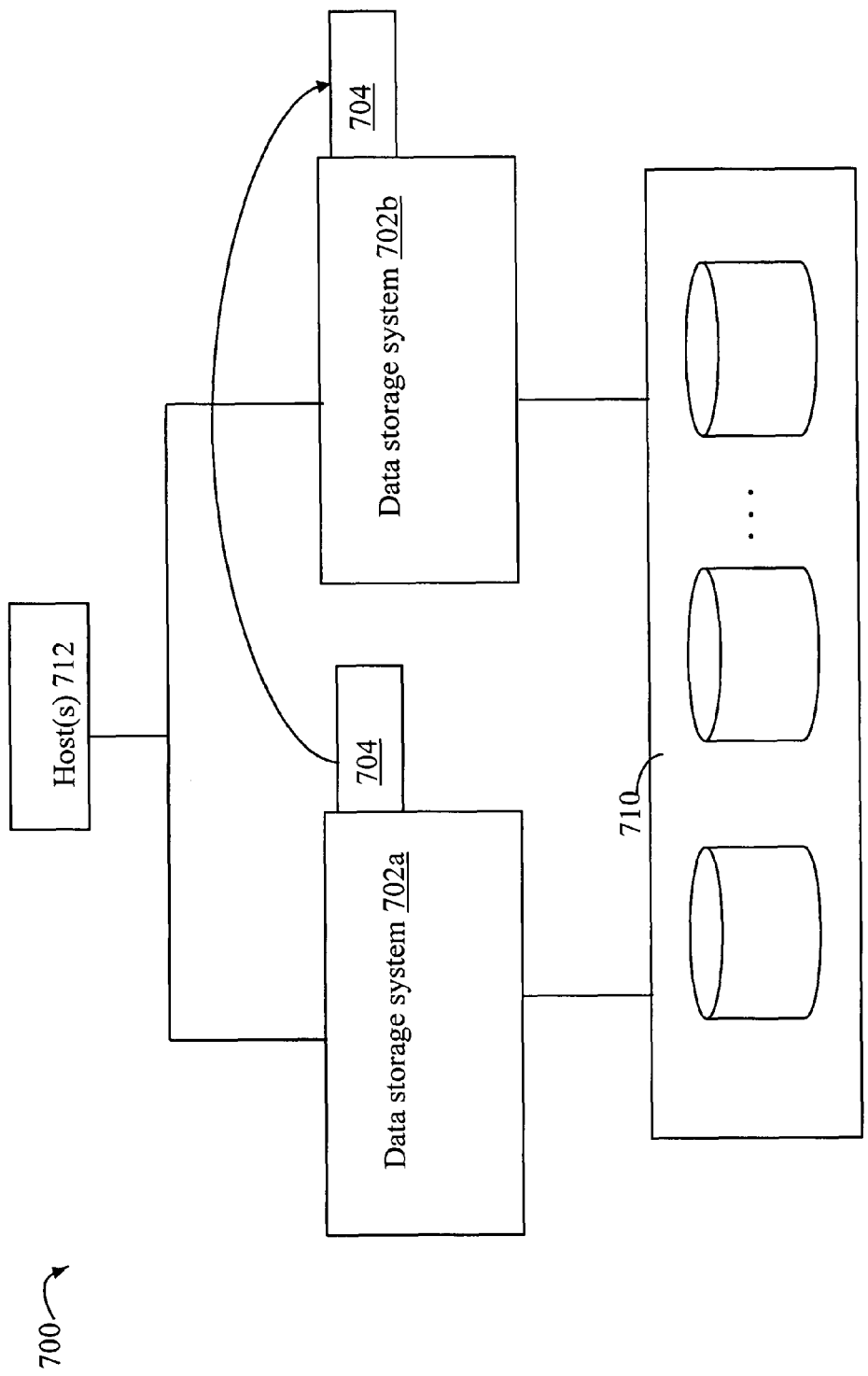
FIG. 9 illustrates a configuration for use in connection with recovery processing.

Referring to FIG. 9, shown is an example 700 illustrating a recovery procedure using the techniques herein. In the example 700, the flash-based memory is represented as element 704. The component 704 can be configured as a removable module that connects and disconnects from other components of the data storage system 702a through module connectors. For example, the foregoing may be accomplished in a manner similar to attaching and detaching a USB memory device from a computer system using a USB port, in a manner similar to connecting and disconnecting a daughter card and mother card in a computer system, and the like. In the event of any type of failure of the system 702a after using the techniques herein to store the cached write data onto 704, the contents of 704 may be easily used in connection with another data storage system such as 702b by connecting 704 thereto. It should be noted that the cached write data of 704 may also be used in connection with recovery processing on the same data storage system that experienced the vaulting event if conditions causing the vaulting event have been corrected.

Figure 10:
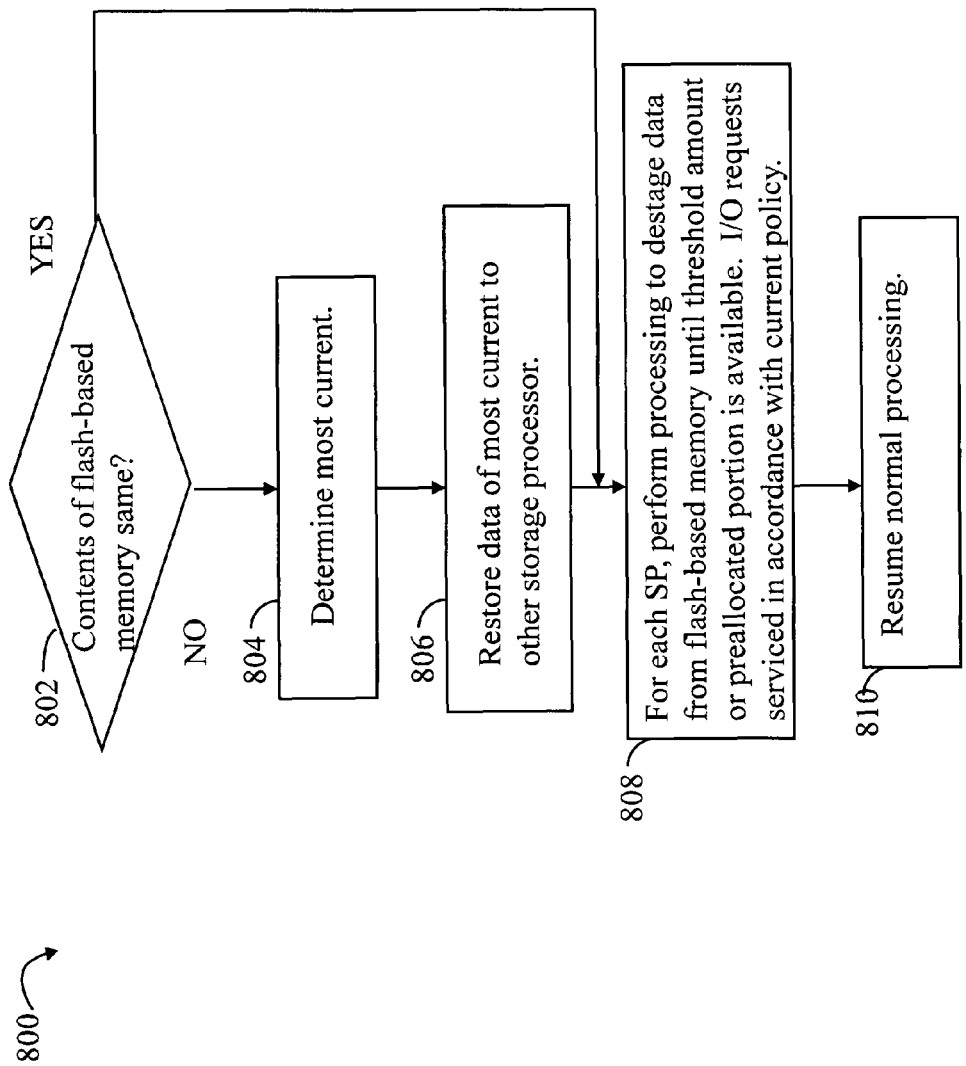
FIGS. 10-12 are flowcharts of processing steps that may be performed in connection with recovery processing in various embodiments using the techniques herein.

FIG. 10 is a flowchart of processing steps that may be performed in an embodiment for recovery processing. The flowchart 800 is illustrated in the context of a dual-processor data storage system. It should be noted that an embodiment may also perform verification processing prior to executing step 802 to ensure that there has been no data corruption, that the identifiers are valid, and the like. At step 802, a determination is made as to whether the contents of the flash-based memories of the two SPs are the same. The determination at step 802 may be made by comparing identifiers associated with the contents of the flash-based memories representing data that has been stored as a result of the vault operation described herein. In connection with processing of step 506 of FIG. 8, each SP may store an identifier, such as a time stamp, generation counter, or other value indicating a version of the data stored on the flash-based memory by the vault operation. The identifier may be used in step 802 by comparing the identifiers of each flash-based memory for each SP. If step 802 evaluates to no, control proceeds to step 804 to determine which SP has the most current copy of the write cache data. At step 806, data from the more current flash-based memory is restored or copied to the other peer SP's flash-based memory. At step 808, for each SP, processing is performed to destage data from the SP's flash-based memory until a threshold amount of the flash-based memory is available. Once this occurs, the I/O requests may be serviced in accordance with normal processing mode as in step 810. Otherwise, the requests may be serviced in accordance with currently defined policies of the data storage system when there is insufficient space in the flash-based memory. In one embodiment, the policy may include allowing read requests but not allowing any write requests. As another example, the policy may include allowing read and write requests but the write request processing includes writing the data directly to the disk and bypassing any write caching to VM or the flash-based memory. The particular policy may vary with embodiment and may differ from the policy utilized in connection with normal processing mode as described herein in which write data is cached to the volatile memory, copied to the flash-based memory, and then destaged to a data storage device.

Using the techniques of FIG. 10, the cached write data remaining on the flash-based memory may be destaged to disk at a later point, for example, while the data storage system has also resumed normal processing of host I/O requests. It should be noted that if the tables of FIG. 6B are to be stored in the VM cache for use in the data storage system, then the tables are also copied to the VM cache prior to resuming normal processing in step 810. Furthermore, although not specifically mentioned, the tables of FIG. 6B may be updated as needed in connection with performing recovery processing of FIG. 10 and others herein to properly reflect the contents of the flash-based memory and VM cache.

Figure 11:
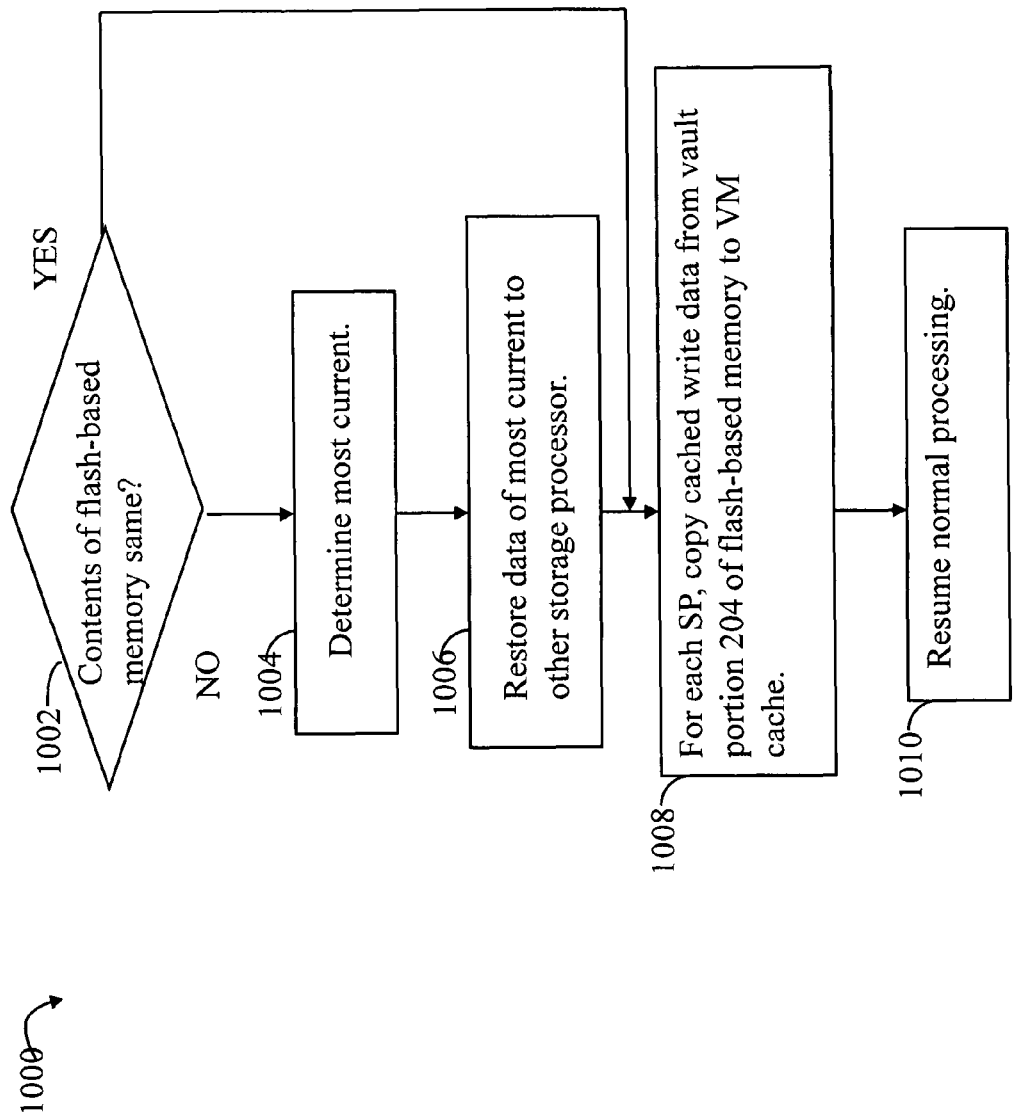

Referring to FIG. 11, shown is a flowchart of processing steps that may be performed in an embodiment for recovery processing. The steps of the flowchart 1000 may be used as an alternative to those set forth in FIG. 10. Steps 1002, 1004, 1006, and 1010 are respectively similar to steps 802, 804, 806 and 810 of FIG. 10 as described above. In step 1008, the cached write data stored on the vault portion (e.g., area 204) of the flash-based memory is copied to the VM cache. Thus, the processing of the flowchart 1000 may be used to restore the data storage processor to its state as prior to the vault operation event which previously triggered performing the vaulting operation and processing, for example, as in step 506 of FIG. 8. Once the cached write data has been copied from the vault portion 204 of the flash-based memory component 32, the data storage system may resume normal processing and is ready to accept write operations from the host. It should be noted that if the tables of FIG. 6B are to be stored in the VM cache for use in the data storage system, then the tables are also copied to the VM cache and appropriately updated prior to resuming normal processing in step 810.

Figure 12:
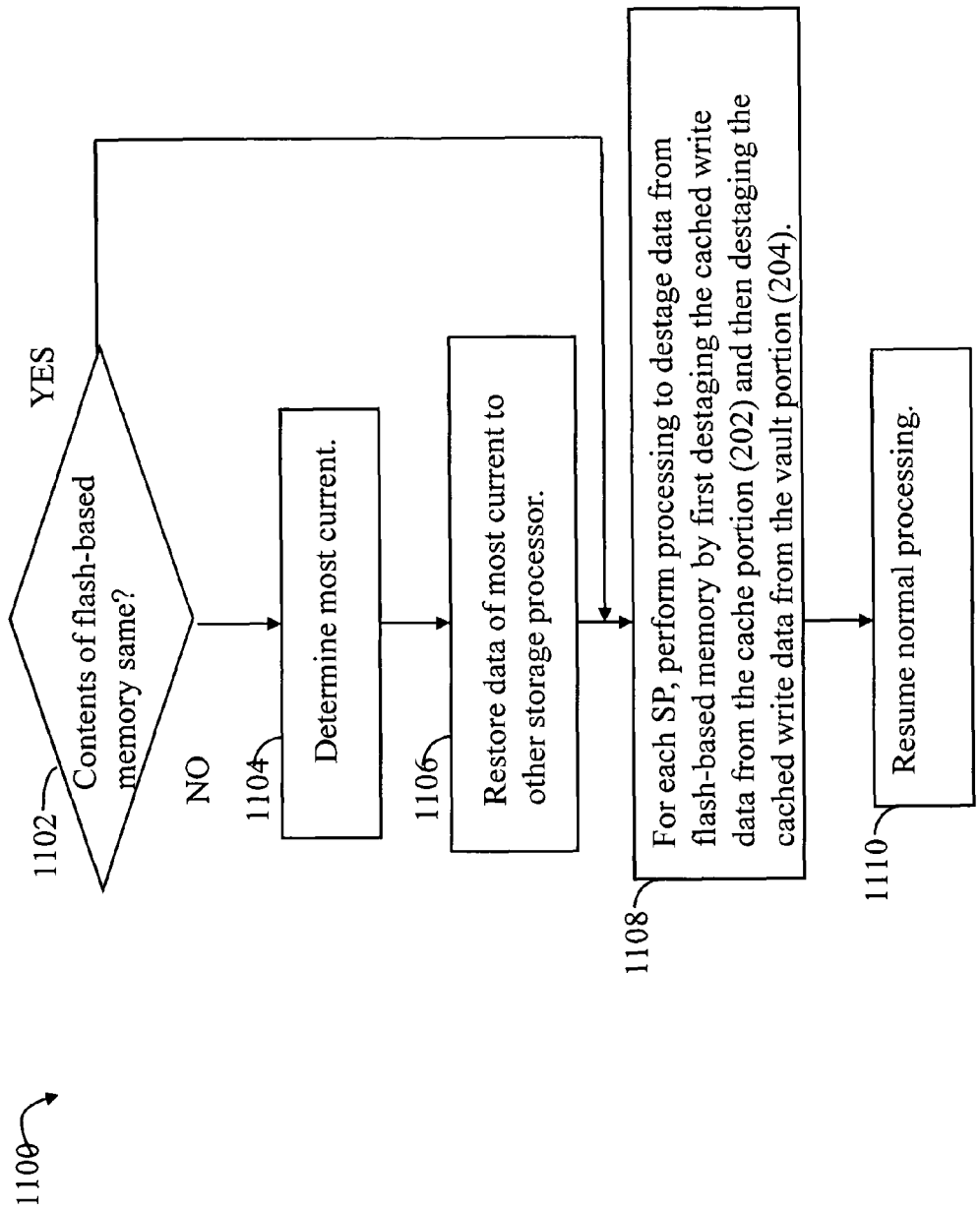

Referring to FIG. 12, shown is a flowchart of processing steps that may be performed in an embodiment for recovery processing. The steps of the flowchart 1100 may be used as an alternative to those set forth in FIGS. 10 and 11. In the flowchart 1100, recovery processing destages all the cached write data from the flash-based memory (e.g., both portions 202 and 204) prior to resuming normal processing and accepting write operations from the host. Steps 1102, 1104, 1106, and 1110 are respectively similar to steps 802, 804, 806 and 810 of FIG. 10 as described above. In step 1108, the cached write data stored on the vault portion (e.g., area 204) of the flash-based memory is copied to the VM cache. Thus, the processing of the flowchart 1100 may be used to restore the data storage processor to its state as prior to the vault operation event which previously triggered performing the vaulting operation and processing, for example, as in step 506 of FIG. 8. Once the cached write data has been copied from the vault portion 204 of the flash-based memory component 32, the data storage system may resume normal processing and is ready to accept write operations from the host.

The steps of flowchart 1100 provide for destaging the data in a particular order of first destaging the cached write data from portion 202 of the flash-based memory, and then destaging the cached write data from the portion 204 of the flash-based memory. However, as will be appreciated by those skilled in the art, the foregoing order in which the cache write data of portions 202 and 204 is destaged may be reversed as a processing variation. It should also be noted that the ordering in which the data is destaged in step 1108 may be used to provide an ordering of destaging the cached write data in step 808 of FIG. 10. In other words, in step 808 of FIG. 10, data may be destaged from the cache portion of the flash-based memory first and then from the vault area of the flash-based memory.

In connection with recovery processing as described herein, the recovery processing may be performed by using a flash-based memory and moving the flash-based memory from a first data storage system to a new data storage system, for example, as illustrated in FIG. 9. Recovery processing may also be performed within a same data system experiencing an event triggering the vault processing operation after the data storage system has been restored to a state in which the condition causing the event has been addressed. For example, if the event was due to a primary source power failure on a data storage system, recovery processing can be performed on the data storage system once the primary source of power has been re-established. In a data storage system with multiple storage processors, a single storage processor may experience a failure and recovery processing may be used to restore the flash-based memory of the failed storage processor once the failed storage processor comes back on line.

In connection with the vault operation processing described herein in the event of a primary power source failure, the secondary power source does not need to power the disk drives as in the case with conventional vaulting to a portion of disk. The techniques herein provide for a continuous process of storing write cache data to the flash-based memory prior to destaging to disk. Thus, when in normal processing mode, a portion of the flash-based memory functions as part of the write cache. When in vault operation processing mode or recovery mode, the entire flash-based memory serves as a vault area with some portion of the VM write cache data being stored on the flash-based memory prior to commencing vault operation processing.

With reference to FIG. 2, an embodiment may select a size of the flash-based memory used as component 32 in accordance with the size of the VM cache 30. Component 32 should have storage capacity that is greater than the size of VM cache 30. If the table(s) of FIG. 6B are stored on the VM cache, then the vault area of the component 32 should include sufficient storage to store the contents of the cached write data in the VM cache 30 and the tables. Selecting how much greater may vary with embodiment. For example, the larger the component 32, the greater the cost. Another factor in selecting the size of the component 32 may vary with the rate at which data is flushed or destaged to disk. The amount of time required to copy remaining portions of the VM cache 30 in connection with the vault operation as described herein may vary in accordance with the size of the VM cache 30 and the speed of the flash-based memory component 32. Additionally with reference to FIG. 4, an embodiment may select sizes for areas 202 and 204 of the flash-based memory vault and cache 32 so that the size of area 202 (Y) is larger than the size of area 204 (X).

It should be noted that the techniques herein for normal processing provide for freeing space in the VM cache 30 after cached write data is copied to the cache portion of the flash-based memory and the table 910 of FIG. 6B is accordingly updated. The foregoing allows for a reduction in the amount of data in the VM cache 30 thereby reducing the amount of cached write data that is copied to the flash-based memory upon the occurrence of a vault operation event. Having less cached write data to copy from the VM cache 30 upon the occurrence of a vault operation event reduces the amount of time required to complete the vault operation processing and also the amount of power that needs to be supplied by the secondary power source to complete the vault operation processing.

In connection with the techniques herein, the data storage system may send an acknowledgement of a write request to a host. An embodiment may configure the data storage system utilizing the techniques herein in which the data storage system acknowledges write requests from a host once the write data is stored in the write cache. With reference to FIG. 2, the acknowledgement may be sent to the host once the write data has been cached in the VM cache 30 so that the host experiences shorter transaction latency than if an acknowledgement is sent when the cached write data is stored on the disks 24. In an embodiment having multiple data storage system processors, processing of write requests may include caching the write data and also mirroring the cached write data in the VM caches of other peer processors. At this point once the cached write data has been mirrored in the VM caches of all SPs of the data storage system, the acknowledgment may be sent to the host. The data flow of the cached write data may proceed as described elsewhere herein.

In one embodiment as described above, upon the occurrence of a vaulting operation event, all cached write data included in the VM cache which have not yet been moved to the flash-based memory are then copied to the vault portion or area of the flash-based memory. As a variation of the foregoing, upon the occurrence of a vaulting operation event, an embodiment may copy the entire contents of the VM write cache to the vault area. In this latter instance, the embodiment may elect not to track the information in table 910 of FIG. 6B although the information in table 920 of FIG. 6B may be maintained and utilized.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A data storage system comprising:
   a volatile memory cache including cached write data that has not yet been destaged to a data storage device;
   a flashed-based memory configured to include:
      a first area for storing at least a portion of cached write data from the volatile memory cache, and
      a second area for storing remaining portions of cached write data from the volatile memory cache not stored in the first area upon the occurrence of a vault operation event; and
   a controller coupled to the volatile memory cache and the flash-based memory, the controller being configured to:
      operate in a first mode of normal processing of data requests in which cached write data is copied from the volatile memory cache to the first area, and then destaged from the first area to a data storage device, and, operate in a second mode in which remaining portions of cached write data from the volatile memory cache not currently included in the first area are copied to the second area upon the occurrence of a vault operation event;
      receive a signal indicating a vault operation event; and
      in response to receiving said signal, operate in said second mode.

2. The data storage system of claim 1, further comprising a secondary power source, and wherein, if the vault operation event is a power failure of a primary power source, the secondary power source operates when in said second mode at least until the remaining portions are copied to said second area.

3. The data storage system of claim 1, wherein one of said volatile memory or said flash-based memory includes information indicating what portions of the cached write data in the volatile memory are stored in the flash-based memory at a current point in time.

4. The data storage system of claim 3, wherein when the controller is in the first mode, the controller is further configured to:
   copy cached write data from the volatile memory cache to the first area;
   update the information indicating what portions of the cached write data have been moved to the flash-based memory in accordance with said copy; and
   indicate as available for reuse a portion of the volatile memory cache including said cached write data copied to the first area.

5. The data storage system of claim 4, wherein the information is stored in the volatile memory cache.

6. The data storage system of claim 4, wherein the information is stored in the flash-based memory.

7. The data storage system of claim 4, wherein when the controller is in the first mode, the controller performs processing to copy the cached write data from the volatile memory cache to the first area and to update the information indicating what portions of the cached write data are stored in the flash-based memory in accordance with said copy as a background process on a continuous basis.

8. The data storage system of claim 7, wherein, if cached write data from the volatile memory cache has been moved to a target location in the flash-based memory, the information includes an indicator indicating the target location as containing the cached write data to be destaged.

9. The data storage system of claim 8, wherein an indicator is maintained for each chunk of flash-based memory, said indicator being set when said each chunk includes cached write data moved from the volatile memory to be destaged, and is not set otherwise.

10. The data storage system of claim 3, wherein, when the controller is in the second mode, the controller is further configured to:
   copy all remaining cached write data from the volatile memory cache not currently in the first area to the second area;
   store a version identifier identifying a version of the cached write data included in the flash-based memory; and
   update the information indicating what portions of the cached write data are stored in the flash-based memory in accordance with said copy.

11. The data storage system of claim 1, wherein said second area has a size larger than a size of said volatile memory cache.

12. The data storage system of claim 1, wherein the data storage system includes multiple storage processors, each of said multiple storage processors including an instance of said volatile memory, said flash-based memory, and said controller local to said each storage processor.

13. A computer-implemented method for managing data in a data storage system, the method comprising:
   while the data storage system is operating in a first mode of normal processing of data requests, copying portions of cached write data not yet destaged to a data storage device from the volatile memory cache to a first area in a flash-based memory and then from the first area to the data storage device; and in response to a vault operation event, operating in a second mode wherein all remaining portions of cached write data from the volatile memory cache not currently included in the first area are copied to a second area of the flash-based memory, wherein when operating in the first mode, the first area is used and the second area is not used for normal processing of data requests.

14. The method of claim 13, further comprising:

updating information indicating whether a portion of cached write data from the volatile memory cache is stored on the flash-based memory after the cached write data is copied to the flash-based memory.

15. The method of claim 14, wherein, after a portion of the volatile memory cache is stored on the flash-based memory, the information identifies a source location in the volatile memory cache including said portion as being available, and the information identifies a target location on the flash-based memory at which the portion is stored as containing cached write data to be destaged.

16. The method of claim 14, wherein the information is stored in the volatile memory.

17. The method of claim 14, wherein the information is stored in the flash-based memory.

18. The method of claim 14, wherein when in the first mode, the method further comprising:

destaging cached write data from the flash-based memory to a data storage device; and accordingly updating the information to indicate that the cached write data is no longer in the flash-based memory.

19. The method of claim 13, wherein the vault operation event is a primary power source failure, and a secondary power source supplies power for at least an amount of time required to copy remaining portions of cached write data from the volatile memory cache not currently included in the first area to the second area of the flash-based memory.

20. The method of claim 13, wherein the copying portions of cached write data not yet destaged to a data storage device from the volatile memory cache to a first area in a flash-based memory is performed as a background processing operation, and wherein the background processing operation further comprises:

determining whether a threshold amount of storage is available on the flashed-based memory; and flushing a portion of cached write data on the flash-based memory to a data storage device if there is not a threshold amount available.

* * * * *